United States Patent
Tong et al.

(10) Patent No.: US 6,804,521 B2
(45) Date of Patent: Oct. 12, 2004

(54) MULTI-BEAM ANTENNA SYSTEM FOR HIGH SPEED DATA

(75) Inventors: Wen Tong, Ottawa (CA); Leo L. Strawczynski, Ottawa (CA); Shalini S. Periyalwar, Ottawa (CA); Claude Royer, Hull (CA)

(73) Assignee: Nortel Networks Limited, St. Laurent (CA)

( * ) Notice: Subject to any disclaimer, the term of this patent is extended or adjusted under 35 U.S.C. 154(b) by 619 days.

(21) Appl. No.: 09/764,663

(22) Filed: Jan. 18, 2001

(65) Prior Publication Data

US 2001/0034236 A1 Oct. 25, 2001

Related U.S. Application Data

(60) Provisional application No. 60/176,303, filed on Jan. 18, 2000, and provisional application No. 60/177,056, filed on Jan. 20, 2000.

(51) Int. Cl.[7] .................................................. H04Q 7/20
(52) U.S. Cl. .................... 455/450; 455/455; 455/464; 370/322; 370/326; 370/338
(58) Field of Search ................................ 455/450, 451, 455/448, 455, 464, 63.1, 561, 278.1, 296; 370/230, 230.1, 282, 322, 324, 326, 328, 330, 332, 336, 338, 341, 345, 348, 350

(56) References Cited

U.S. PATENT DOCUMENTS

| | | | |
|---|---|---|---|
| 5,507,034 A | * | 4/1996 | Bodin et al. ............. 455/452.2 |
| 5,539,730 A | * | 7/1996 | Dent .......................... 370/280 |
| 5,584,046 A | * | 12/1996 | Martinez et al. ............ 455/13.1 |
| 5,590,399 A | * | 12/1996 | Matsumoto et al. ......... 455/449 |
| 5,596,333 A | * | 1/1997 | Bruckert ..................... 342/457 |
| 5,818,832 A | * | 10/1998 | McCallister ................ 370/350 |
| 5,844,894 A | * | 12/1998 | Dent .......................... 370/330 |
| 6,052,594 A | * | 4/2000 | Chuang et al. ............. 455/450 |
| 6,084,869 A | * | 7/2000 | Fishman et al. ............ 370/348 |
| 6,141,565 A | * | 10/2000 | Feuerstein et al. .......... 455/560 |
| 6,262,980 B1 | * | 7/2001 | Leung et al. ............... 370/336 |
| 6,301,238 B1 | * | 10/2001 | Hagerman et al. .......... 370/336 |
| 6,453,176 B1 | * | 9/2002 | Lopes et al. ............. 455/562.1 |
| 6,490,261 B1 | * | 12/2002 | Dent et al. .................. 370/337 |
| 6,490,262 B1 | * | 12/2002 | Hogger ....................... 370/337 |

* cited by examiner

Primary Examiner—William Trost
Assistant Examiner—Stephen D'Agosta
(74) Attorney, Agent, or Firm—Bruce Garlick

(57) ABSTRACT

A system and method reduces cross-beam interference in multi-beam wireless data-transmission system through temporal separation of the multiple beams. A sector of a cell is geographically divided such that a number of beam patterns correspond to a number of user-group areas. For example, the sector can be divided such that four user-group areas are created. The number of groups and beam patterns can be increased or decreased. Forward link transmissions from a base station to a plurality of user terminals are patterned such that transmissions to adjacent user-group areas do not occur during the same time intervals. According to one operation, pilot signal transmissions are suppressed within a beam if no data is transmitted during a corresponding temporal period. According to another operation, temporal guard slots are introduced to avoid inter-cell interference. Further, in some operations, user terminals report to the base station to indicate one or more preferred user-group areas for their inclusion.

38 Claims, 11 Drawing Sheets

MULTI-BEAM ANTENNA SYSTEM FOR HIGH SPEED DATA

CROSS-REFERENCES TO RELATED APPLICATIONS

The present application claims priority pursuant to 35 U.S.C. Sec 119(e) to U.S. Provisional Application Ser. No. 60/176,303, filed Jan. 18, 2000, and to U.S. Provisional Application Ser. No. 60/177,056, filed Jan. 20, 2000, both of which are hereby incorporated by reference in their entirety.

BACKGROUND

1. Technical Field

The invention relates generally to wireless networks; and more particularly to interference reduction in cellular wireless data transmissions in such wireless networks to increase data handling capacity.

2. Related Art

Wireless networks are well known. Cellular wireless networks support wireless communication services in many populated areas of the world. Satellite wireless networks are known to support wireless communication services across most surface areas of the Earth. While wireless networks were initially constructed to service voice communications, they are now called upon to support data communications as well.

The demand for data communication services has exploded with the acceptance and widespread use of the Internet. While data services have historically been serviced via wired connections, wireless users are now demanding that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless network data communications will only increase with time. Thus wireless networks are currently being created/modified to service these burgeoning data service demands.

Significant performance issues exist when using a wireless network to service data communications. Wireless networks were initially designed to service the well-defined requirements of voice communications. Generally speaking, voice communications require a sustained bandwidth with minimum signal-to-noise ratio (SNR) and continuity requirements. Data communications, on the other hand, have very different performance requirements. Data communications are typically bursty, discontinuous, and may require a relatively high bandwidth during their active portions. To understand the difficulties in servicing data communications within a wireless network, consider the structure and operation of a cellular wireless network.

Cellular wireless networks include a "network infrastructure" that wirelessly communicates with user terminals/mobile stations within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

The wireless link between the base station and the USER TERMINAL is defined by one of a plurality of operating standards, e.g., AMPS, TDMA, CDMA, GSM, etc. These operating standards, as well as new 3G and 4G operating standards define the manner in which the wireless link may be allocated, setup, serviced and torn down. These operating standards must set forth operations that will be satisfactory in servicing both voice and data communications.

FIG. 1A illustrates a portion of a prior art cellular wireless network, and in particular a cell 100 of such a wireless network. As is shown, the cell 100 is subdivided into sectors 1, 2, and 3. The wireless network supports wireless communications within each of these sectors. In a typical installation, three separate transceiver units support the three separate sectors via three separate antennas. With this subdivision, user terminals 102, 108, 114, 116, and 118 are supported in sector 1. Further, user terminals 104, 110, 120, and 122 are supported in sector 2. Finally, user terminals 106, 112, 124, and 126 are supported in sector three. Both voice and data communications are supported within cell 100. In FIG. 1A, user terminals 102, 104, and 106 are voice units, while user terminals 108–126 are data units.

In operation, a user terminal, e.g., any of user terminals 102–126, communicates with a base station that supports the cell 100. A BSC coupled to the base station routes voice communications between the MSC and the serving base station. The MSC routes the voice communication to another MSC or to the PSTN. BSCs route data communications between a servicing base station and a packet data network that may include the Internet.

In the conventional multi-sector system of FIG. 1A, data is transmitted at any given time over all of the sectors, as is illustrated in FIG. 1B. However, the time continuum must be shared by all of the user terminals operating within each of the sectors. In a CDMA system, transmissions to different users within a sector are distinguished using Walsh coding wherein a single Walsh code, or plurality of Walsh codes is/are used to distinguish each user. Each sector has a separate pilot signal multiplexed with the data signal that is then transmitted from a sectorized antenna structure. A consequence of these simultaneous transmissions is inter-sector interference, especially with respect to mobiles located near the sector borders. Further, inter-cell interference occurs for users located at the boundaries of cells where users receive signals from two (or more) base stations. Users in those regions may receive weaker signals and receive higher interference. The higher interference adversely affects performance within the sector reducing the data rate that may be throughput upon the forward link.

Thus, there is a need in the art for a system and method of operating a cellular wireless system to increase data throughput capacity.

SUMMARY OF THE INVENTION

A system and method of the present invention employs a multi-beam per sector solution with interference avoidance to increase data handling within a cellular wireless network. As described herein, the present invention exploits packet data transmission characteristics and designs the transmission time interval and the basic slot structure of packet data transmissions such that the forward link packets transmitted among adjacent beams of a multi-beam per sector configuration are orthogonal in time.

The entire multi-beam configuration for a base station is arranged such that no adjacent beams, even across sector boundaries, are transmitting data on the forward link during the same time intervals. Thus, to achieve interference avoidance, the present invention involves synchronizing the packet transmission timing interval and scheduling packet transmission times such that adjacent beams do not transmit data during the same intervals.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The present invention will be described below with reference to the accompanying drawings, wherein.

DETAILED DESCRIPTION OF THE DRAWINGS

Figure 1A:
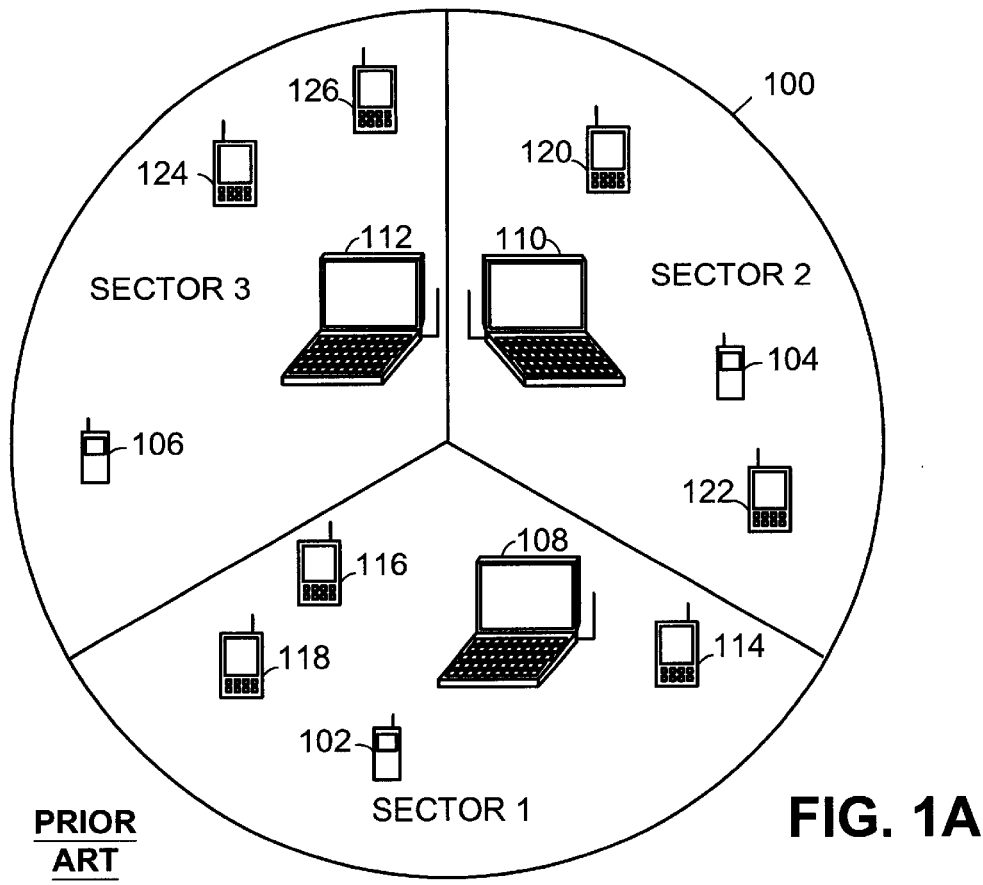
FIG. 1A is a diagram illustrating a cell of a prior art cellular wireless network.
Figure 1B:
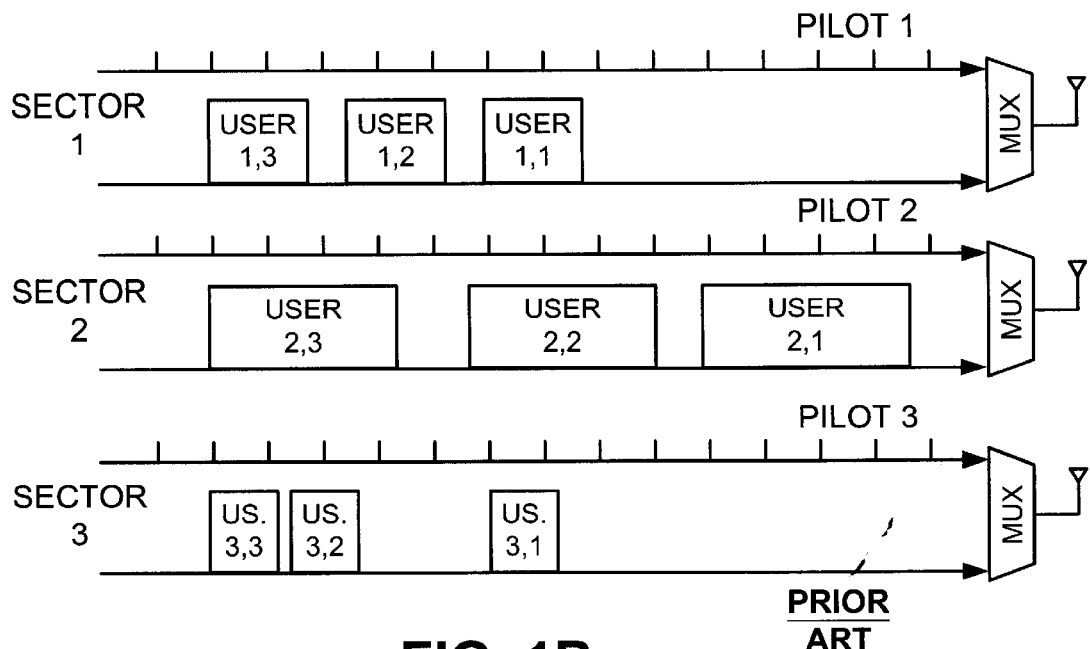
FIG. 1B is a timing diagram illustrating forward link transmissions in the system of FIG. 1A.
Figure 2A:
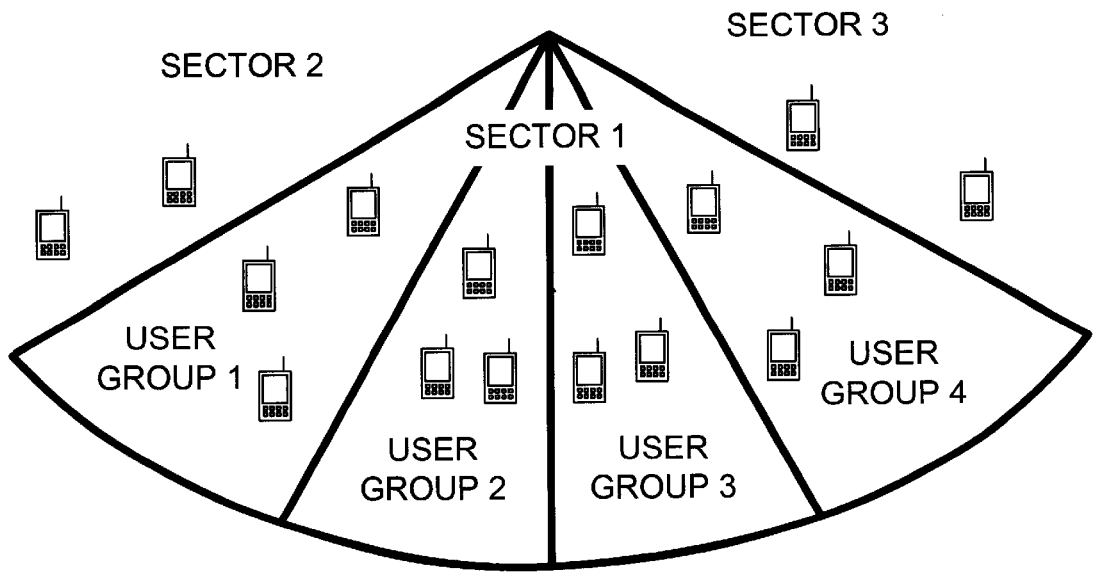
FIG. 2A is a diagram illustrating a sector of a cell in a wireless network that uses a multi-beam configuration for forward link transmissions.

FIG. 2A is a diagram illustrating a sector of a cell in a wireless network that uses a multi-beam configuration for forward link transmissions. A sector, cell, or group of cells may be referred to herein as a "transmission area." The multiple beams are used to spatially separate the sector into user-group areas, e.g., user-group area 1, user-group area 2, user-group area 3, and user-group area 4. This operating methodology may be employed in a High Speed Data (HSD) application to service forward link transmissions. By using the multi-beam per sector configuration, the potential for interference is reduced and, resultantly, the wireless servicing capacity within the sector increases.

Figure 2B:
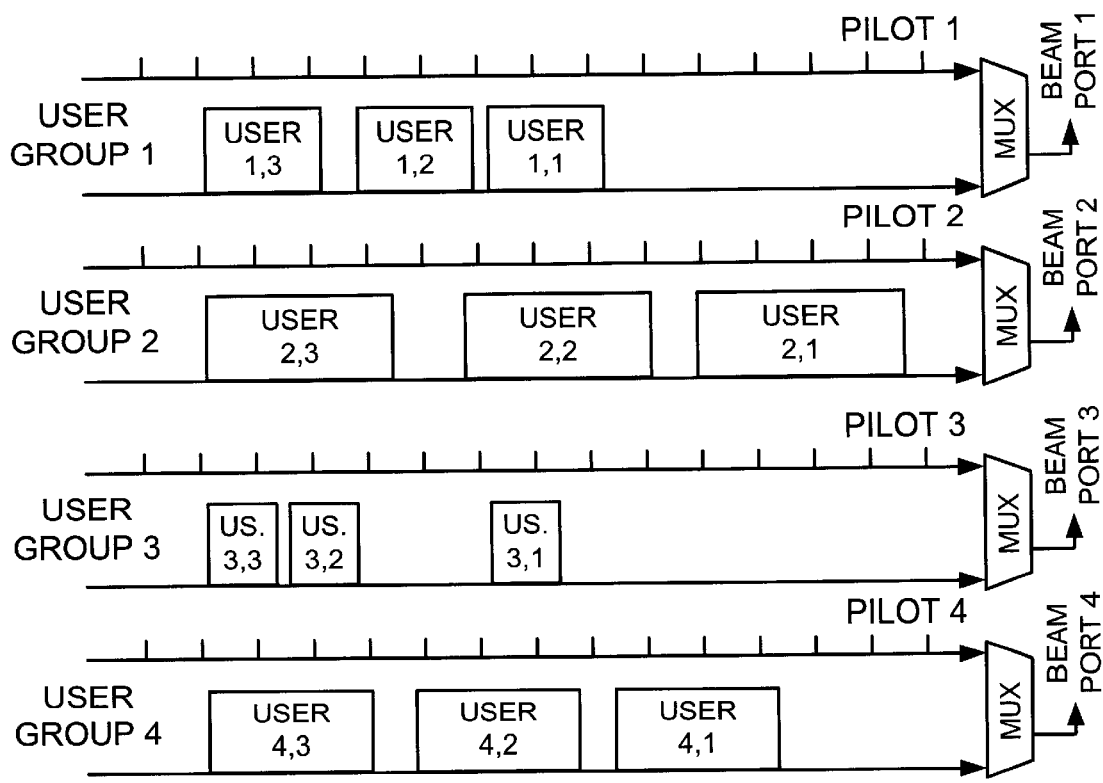
FIG. 2B is a timing diagram illustrating forward link transmissions in the sector of FIG. 2A.

FIG. 2B illustrates the manner in which data is transmitted on the forward link to the user terminals operating in the sector of FIG. 2A. Users 1, 2, and 3 of user-group area 1 receive forward link transmissions via beam port 1. Users 1, 2, and 3 of user-group area 2 receive forward link transmissions via beam port 2. Further, users of user-group areas 3 and 4 receive forward link transmissions via beam ports 3 and 4, respectively. Changing the number of beams could also accommodate additional or fewer user-group areas.

The use of narrow beams provides some degree of interference reduction. The accuracy of the beam pattern limits the performance of the multi-beam system. In this system, user-group areas are subject to interference from adjacent user-group areas. Further, the edge user-group areas (i.e. user-group areas 1 and 4) may be subjected to interference from the user-group areas of the immediately adjacent sectors. This is true even though the adjacent user-group areas may also have the benefit of narrow beam patterns; in practical application, the beam patterns will overlap and interfere, and will not be spatially orthogonal.

To overcome these shortcomings, as described with reference to the accompanying drawings and the description herein, the system and method of the present invention reduces cross-beam interference in multi-beam wireless data-transmission system. According to the present invention, such crossbeam interference is avoided through temporal separation of the multiple beams. According to these operations, sectors may be spatially divided as described above, such that a number of beam patterns correspond to a number of user-group areas.

For example, the sector may be divided such that four user-group areas are created. As discussed, the number of user-groups and beam patterns may be increased or decreased to meet the local communication needs. Instead of simultaneous transmissions of voice and/or data to the different user-group areas within a sector, in the present invention, as shown in FIG. 2B, transmission is patterned such that adjacent user-group areas do not receive transmissions during the same time intervals.

The principles of the present area may also be extended to apply to transmissions within adjacent sectors or cells. In such case, transmissions within the adjacent cells are synchronized and are managed to prevent transmission overlap. With the particular explanations provided herein of focused beams within a sector, it would be apparent how these principles could be applied to adjacent cells. Particular examples of the application of these principles is further discussed herein with reference to FIGS. 8A and 8B.

Figure 3:
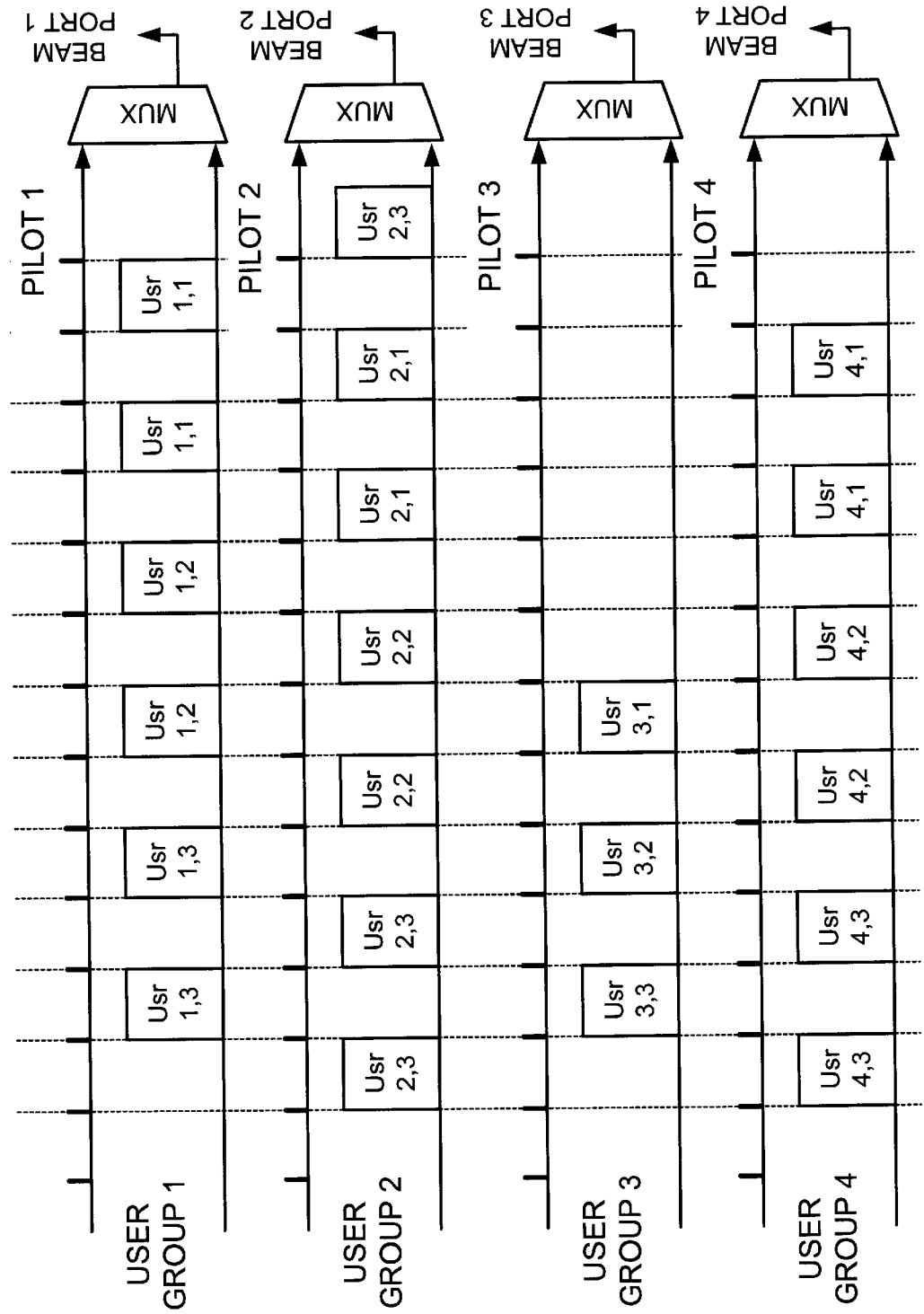
FIG. 3 is a timing diagram illustrating a first embodiment of the present invention in which forward link data transmissions in adjacent beams of a multi-beam system are offset in time to avoid overlap.

FIG. 3 is a timing diagram illustrating a first embodiment of the present invention in which forward link data transmissions in adjacent beams of a multi-beam system are offset in time to avoid overlap. In a design having four user-group area areas in a sector, as shown in FIG. 3, the "even" time slots carry transmissions for user-group area areas 1 and 3, whereas the subsequent "odd" time slots carry data transmissions for user-group areas 2 and 4. Thus, within the sector, adjacent user-group areas would not interfere with one another since forward-link transmission is alternated.

Transmitted with each user group is a pilot signal that is synchronized with the respective transmissions. The respective pilot signals are shown as relatively short and dark lines residing above the user group data and are labeled as pilot 1, pilot 2, pilot 3, and pilot 4. The pilot signals may be time domain multiplexed with the user group data, punctured into the user group data, or distinguished from the data using a CDMA technique, e.g., Walsh code.

The entire cell site is synchronized such that transmissions from neighboring user-group areas of adjacent sectors do not interfere with one another. In one embodiment, each user terminal knows the synchronization (transmission scheme) and slot structure used by the base station so that it properly receives and decodes the transmissions. Synchronization and slot structure information is conveyed to the user terminal either by signaling this information to the user terminal or by the user terminal determining this information by processing the received signal.

In the diagram, "USER 1,3", for example, refers to user 3 in the first user-group area of the sector. Similar notation is used to indicate the destination user of the data shown in the diagrams. A pilot signal is used for each beam/user-group area in the sector, which is multiplexed/punctured/code divided with the data signal transmitted to a user-group area. In one method for making associations between specific users and the corresponding user-group areas/beams, a one-to-one mapping of the forward and reverse links is used to establish what beam should be used to transmit to a user terminal. Here the reverse link, that is, the signal received from a user terminal, is received on different sectors and different beams within the sectors. The base transceiver station (BTS, a component of the base station) makes the determination, based on the received signals, what the optimal beam would be for servicing the user terminal. Optimality may be based on largest received signal strength or other criteria. The optimal signals from different BTSs are compared to select the serving BTS.

After the base station has decided in what beam to place that user terminal, the user terminal may send back a signal to the base station indicating the signal-to-noise ratio (S/N) or carrier-to-interference (C/I) ratio of the received signal on that beam, preferably using the pilot signal to calculate the C/I ratio. This information is then used at the base station to establish an optimal data transmission rate. As is generally known, the rate at which data may be transmitted on the forward link to a user terminal is limited by the quality of the channel. The manner in which data rates are selected to correspond to channel quality is generally known and will not be further described herein.

Synchronization of transmissions from different beams within the same sector is easily accomplished using a common timing source, e.g., a GPS timing reference that is employed in a CDMA system. This timing technique may be extended to the synchronization of transmissions from different sectors within a cell and to transmissions from different cells.

Figure 4:
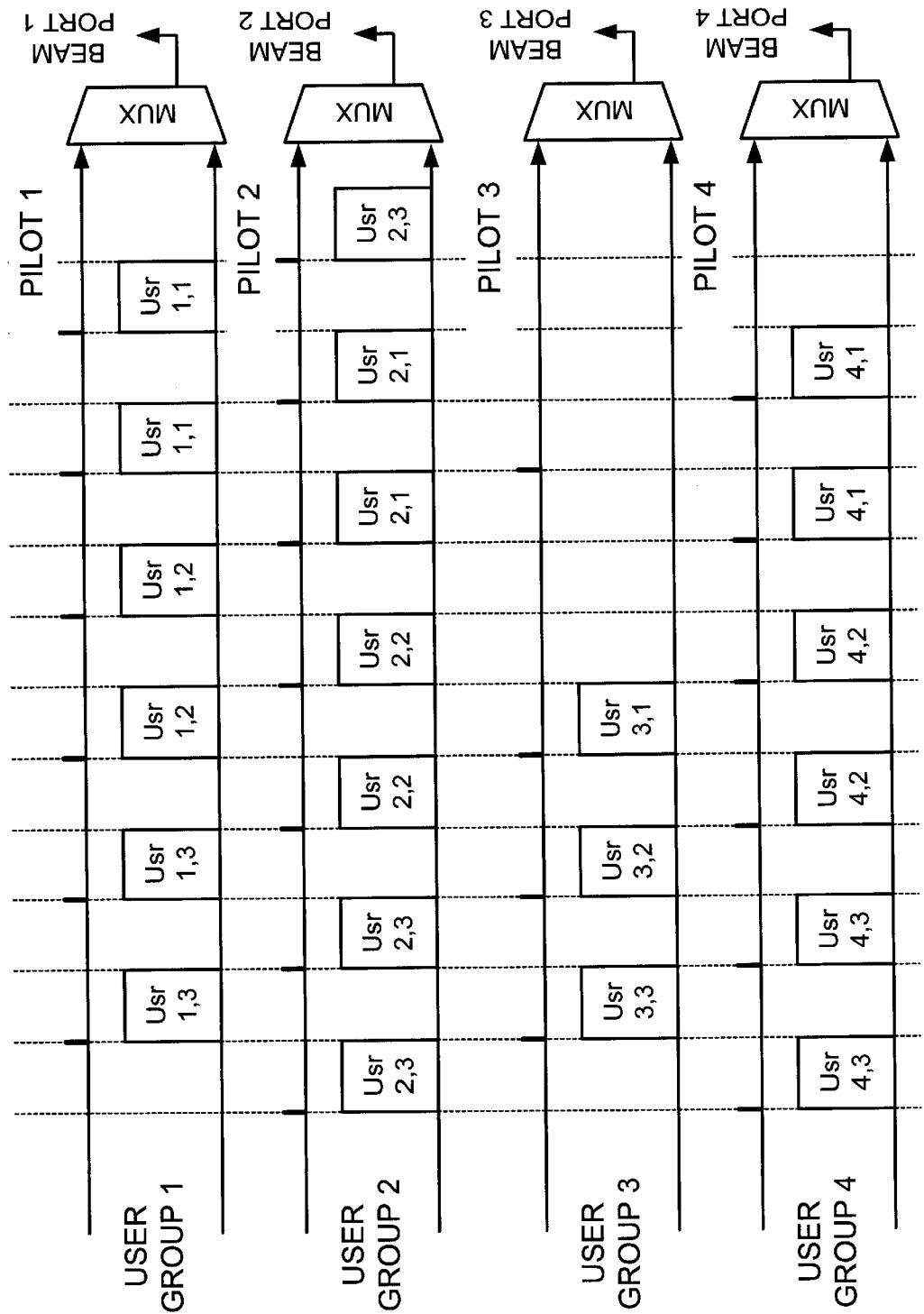
FIG. 4 is a timing diagram illustrating a second embodiment of the present invention in which forward link data transmissions in adjacent beams of a multi-beam system are offset in time to avoid overlap and in which pilot signal transmissions in a beam are suppressed when no data is present.

FIG. 4 is a timing diagram illustrating a second embodiment of the present invention in which forward link data transmissions in adjacent beams of a multi-beam system are offset in time to avoid overlap and in which pilot signal transmissions in a beam are suppressed when no data is present. Here each beam is assigned and multiplexed with a separate pilot signal. These pilot signals are structured such that the pilot is suppressed during the intervals where no data is to be transmitted on the given beam.

In this method, the user terminal selects the beam and base station to be used based upon S/N or C/I measurements of the pilot signals of the various beams the user terminal receives. It then sends to the base station information on the S/N ratio for the best beam based on its measurements. In this operation, the best beam is used for the subsequent forward link transmissions. With this embodiment, the suppressed pilot signals will therefore not interfere with other pilot signals or other data transmissions. Because the pilot signals are not transmitted during time intervals when no data will be transmitted for a user group, the user terminals may measure a better channel quality indication. Thus, better user group selection is possible.

A variation on this method involves the user terminal sending information regarding the best few beams. In practice, the received beams from the user terminal perspective may only have slight variations in S/N ratios. Under these circumstances, it may be better to relay information regarding all of these few beams to the base transceiver station. The base station then can decide to use a beam that may not be optimal in terms of S/N ratio, but would provide more efficient load sharing and thus, better system performance.

In one variation of this embodiment, the pilot signal is transmitted every other time interval such that it corresponds to time intervals that are allocated to the user group. However, in another embodiment, the pilot signal is further suppressed when no data is transmitted during an allocated time interval. However, in order to allow user terminals to determine channel quality conditions for the user group in which data is not being transmitted, the pilot signal must be periodically transmitted even when data is not present, even though such pilot signal transmission is not transmitted in each allocated time interval. Thus, for example, the pilot signal for user group 3 is transmitted every four slot cycles even when data is not transmitted for the user group. Thus, user terminals are able to determine channel quality for the user group based upon the transmitted pilot signal.

Figure 5:
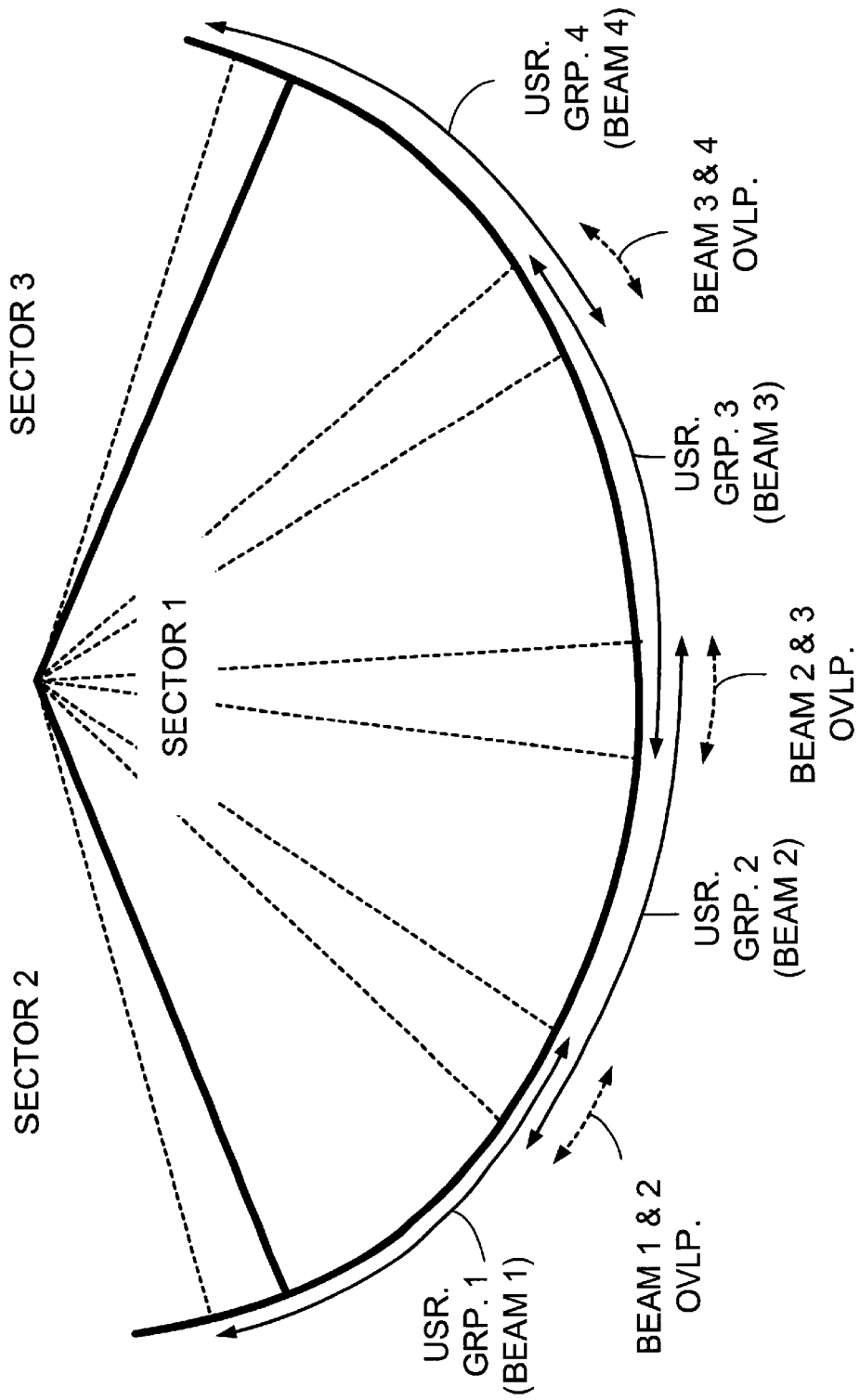
FIG. 5 is a diagram illustrating a sector of a cell of a wireless network having fat multi-beams such that adjacent beams overlap.

FIG. 5 is a diagram illustrating a sector of a cell of a wireless network having fat multi-beams such that adjacent beams overlap. As shown in FIG. 5, beams 1 through 4 service user-group areas 1 through 4, respectively. However, each of the beams overlaps with its adjacent beams. For example, beam 2 overlaps with beam 1 and beam 3. As shown, beam overlap regions therefore exist between each beam/group. In each of these beam overlap regions, one of the beams may provide better channel quality for user terminals operating in these regions. Thus, according to one aspect of the present invention, the user terminals, and the base station/BTS interact so that each of the user terminals will be serviced by a beam providing the best channel quality.

Figure 6:
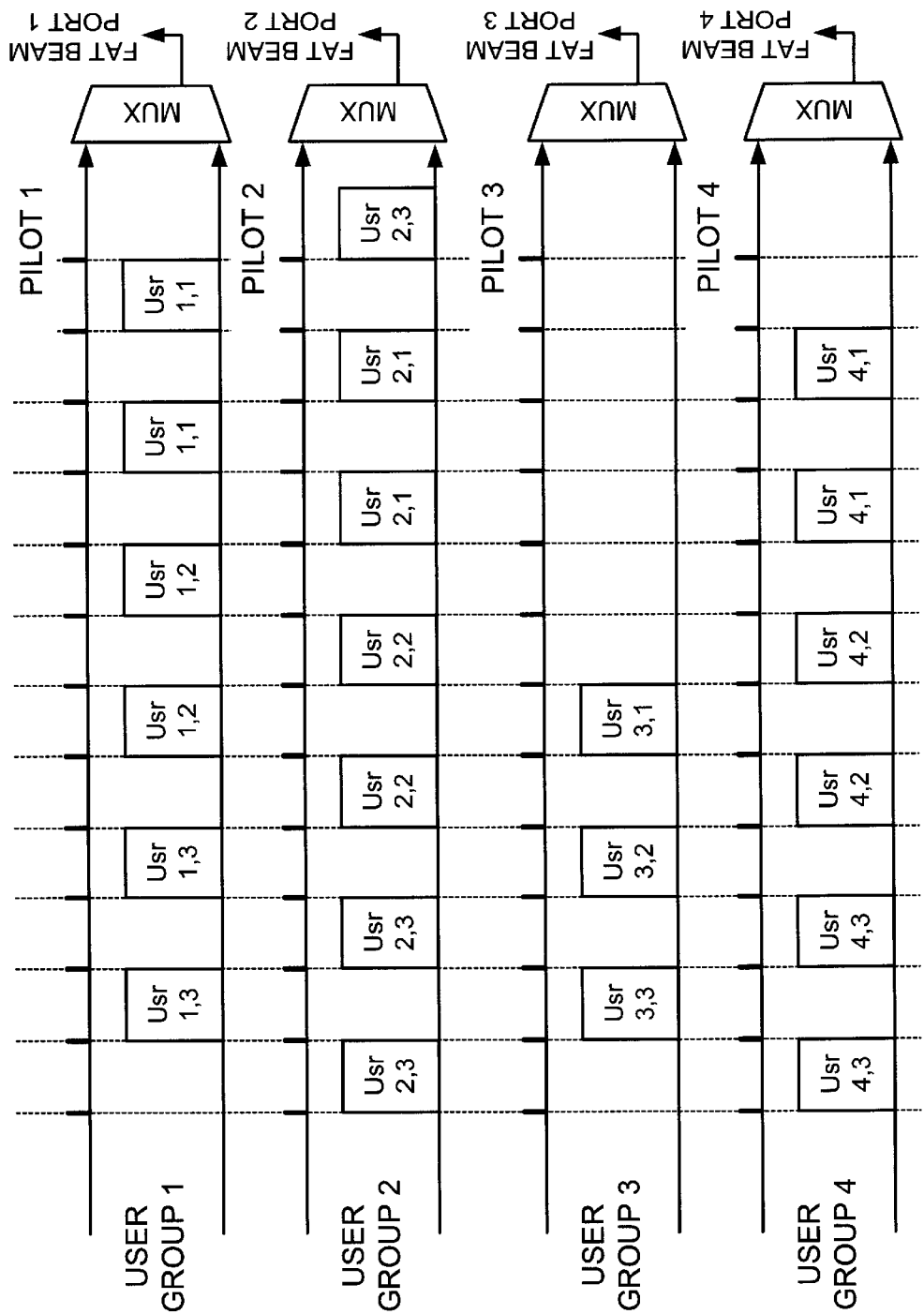
FIG. 6 is a timing diagram illustrating a third embodiment of the present invention used in accordance with the fat multi-beam system of FIG. 5 in which fast beam selection is employed.

FIG. 6 is a timing diagram illustrating a third embodiment of the present invention used in accordance with the fat multi-beam system of FIG. 5 in which fast beam selection is employed. A feature of this embodiment of the invention is a variation on the method described with respect to FIG. 4. Here, instead of suppressing the pilot signal during the non-transmission intervals, the pilots are sent continuously. The user terminal measures the various received pilot signals to determine which received beam provides the best channel quality. Here, also, the user terminal has some knowledge of which time slots are actually going to be used for data transmission. With this information, the user terminal can compensate for the fact that the measured pilot signals are transmitted continuously whereas actual data transmission for a given beam would only occur during certain time intervals in accordance with the invention.

For example, if a user terminal in user-group area 2 measures pilot signals, there is a certain signal power in the pilot associated with user-group areas 1 and 3, in addition to that associated with user-group area 2. If the user terminal has knowledge of which time slots will be used by neighboring user-group areas, it can compensate appropriately when calculating the signal to noise ratio. It need not be concerned over the signal power in pilot beams 1 and 3 since, when data will actually be transmitted in beam 2, no data will be transmitted in adjacent beams 1 and 3, and thus, those signal powers can be subtracted out. For example, when data is transmitted to user 3 of user-group area 2, no data is transmitted within user-group areas 1 and 3. Thus, users of group 2 can, during this interval, accurately measure the pilot signal to calculate the current signal to noise ratio. Based upon this calculation, the user terminal may interact with the base station to secure forward link transmission upon the beam having the best quality.

In an operation according to this embodiment, each user terminal reports the code of the pilot signal with the best instantaneous carrier to interference ratio. In response, the BTS determines the best beam upon which to schedule forward link transmissions to the user terminal. The BTS then schedules the packet transmissions across the beam identified as the best beam by the user terminal. This operation will be repeated each time that the user terminal measures the pilot signals and/or when the user terminal determines that a different pilot signal has a better instantaneous carrier to interference ratio.

In an alternate operation according to this embodiment, each user terminal reports to the base station the codes of the pilots with the best instantaneous C/I ratios. The determination as to which of the pilot signals to report may be based upon a fixed threshold or be based upon the relative different in carrier to interference ratio for the pilot signals considered. The base station makes a list of the beams corresponding to these pilot signals and subsequently, makes forward link transmissions to the user terminal on one or more of the beams to load balance among the beams.

Figure 7:
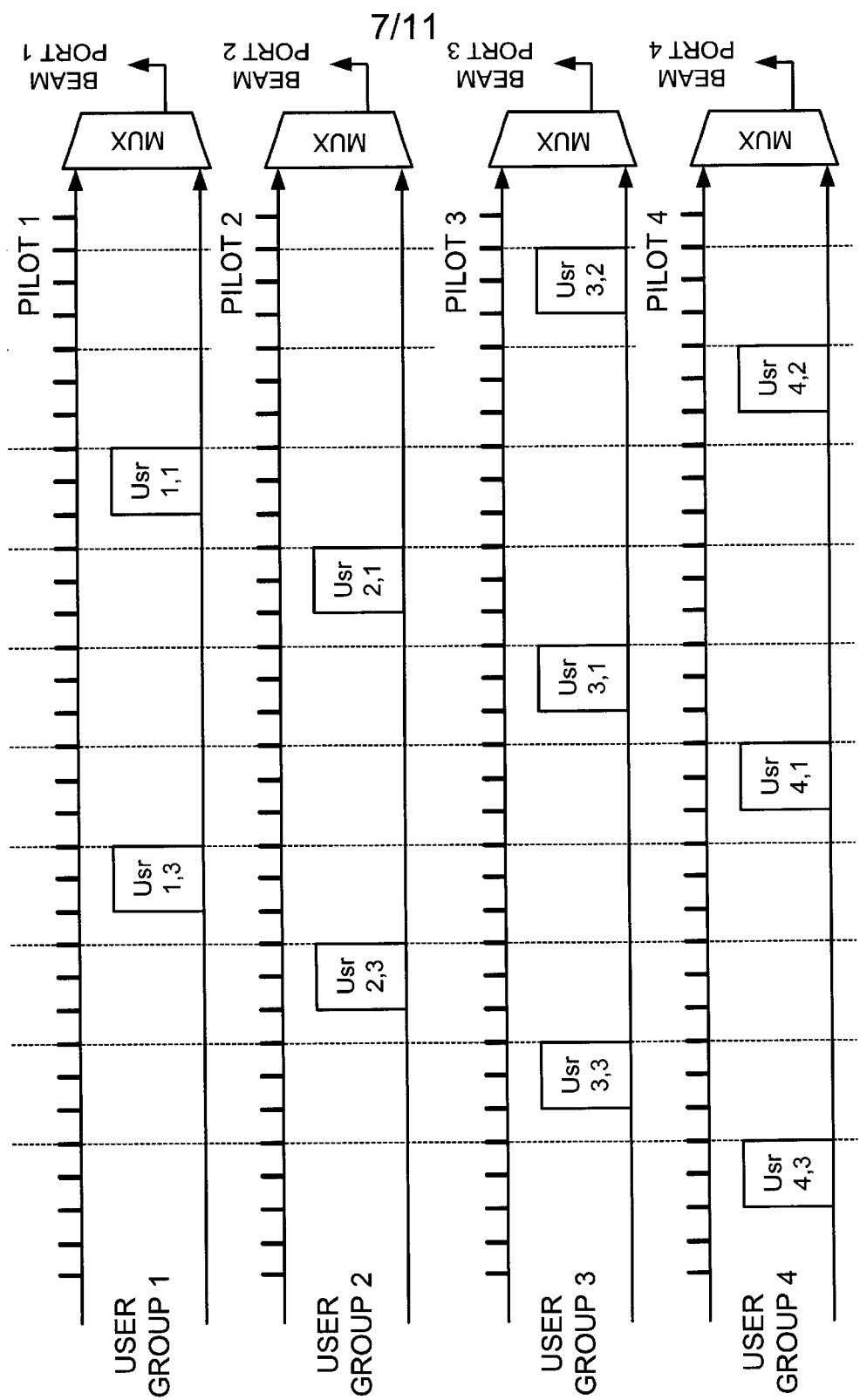
FIG. 7 is a is a timing diagram illustrating a fourth embodiment of the present invention in which forward link transmissions in a multi-beam sector are offset in time to avoid all overlap between the beams of the sector and optionally, between beams of adjacent base stations.

FIG. 7 is a is a timing diagram illustrating a fourth embodiment of the present invention in which forward link data transmissions a multi-beam sector are offset in time to avoid all overlap between the beams of the sector and optionally, between beams of adjacent base stations. The principles of the present invention are also applicable to multiple base stations to reduce cell-to-cell interference. The operation of the invention with respect to multiple base stations is essentially the same as that for multiple beams or sectors. One difference is that propagation delay, due to the larger transmission distances and the geographic separation of the base stations, must be taken into account. For this reason, the pilot needs to be of sufficient duration that the user terminals can make accurate estimates for base station selection. In configuring the timing of such a system, it is appropriate to provide for a propagation protection margin or guard time. Transmissions that include this guard time are shown in FIG. 7, to prevent overlapping of data transmissions in not only adjacent beams/sectors but also in adjacent base stations.

Figure 8A:
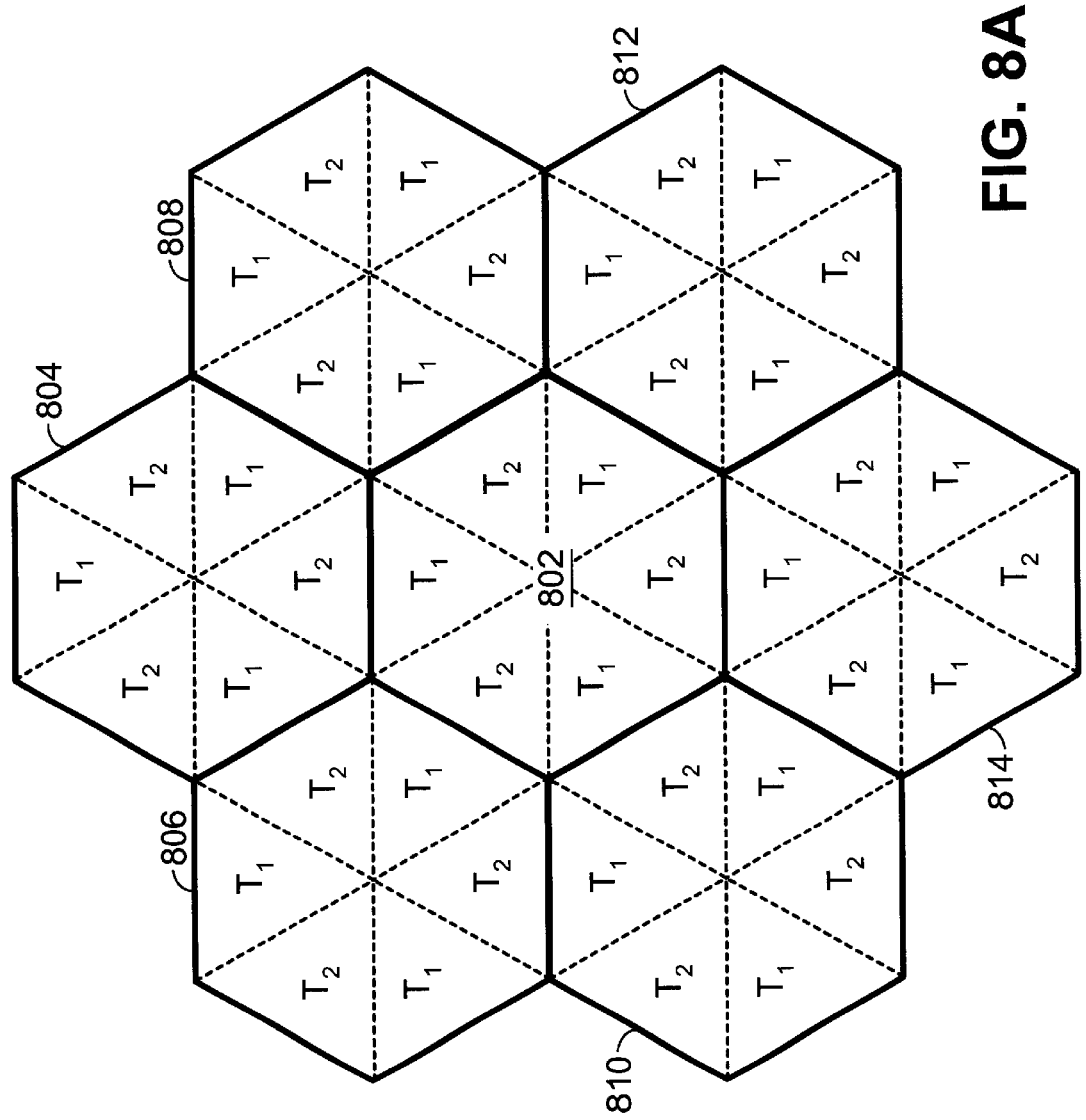
FIG. 8A is a diagram illustrating an arrangement of seven cells in a hexagonal pattern with which a first technique of interference avoidance of the present invention is employed.

FIG. 8A is a diagram illustrating an arrangement of seven cells in a hexagonal pattern with which a first technique of interference avoidance of the present invention is employed. Cells 802–814 are each subdivided into six sectors. The sectors are each designated either $T_1$ or $T_2$. Sectors designated $T_1$ transmit on their respective forward links during first time intervals while sectors designated $T_2$ transmit on their respective forward links during second time intervals, wherein the second time intervals do not overlap with the first time intervals. The timing diagram of FIG. 3 illustrates one possible operation for the arrangement of FIG. 8A where user group 1 represents one of the $T_1$ sectors while user group 2 represents an adjacent $T_2$ sector. Thus, with this operation and arrangement each sector is surrounded by sectors that transmit during differing time intervals, thus reducing bother intercell and adjacent sector interference.

Figure 8B:
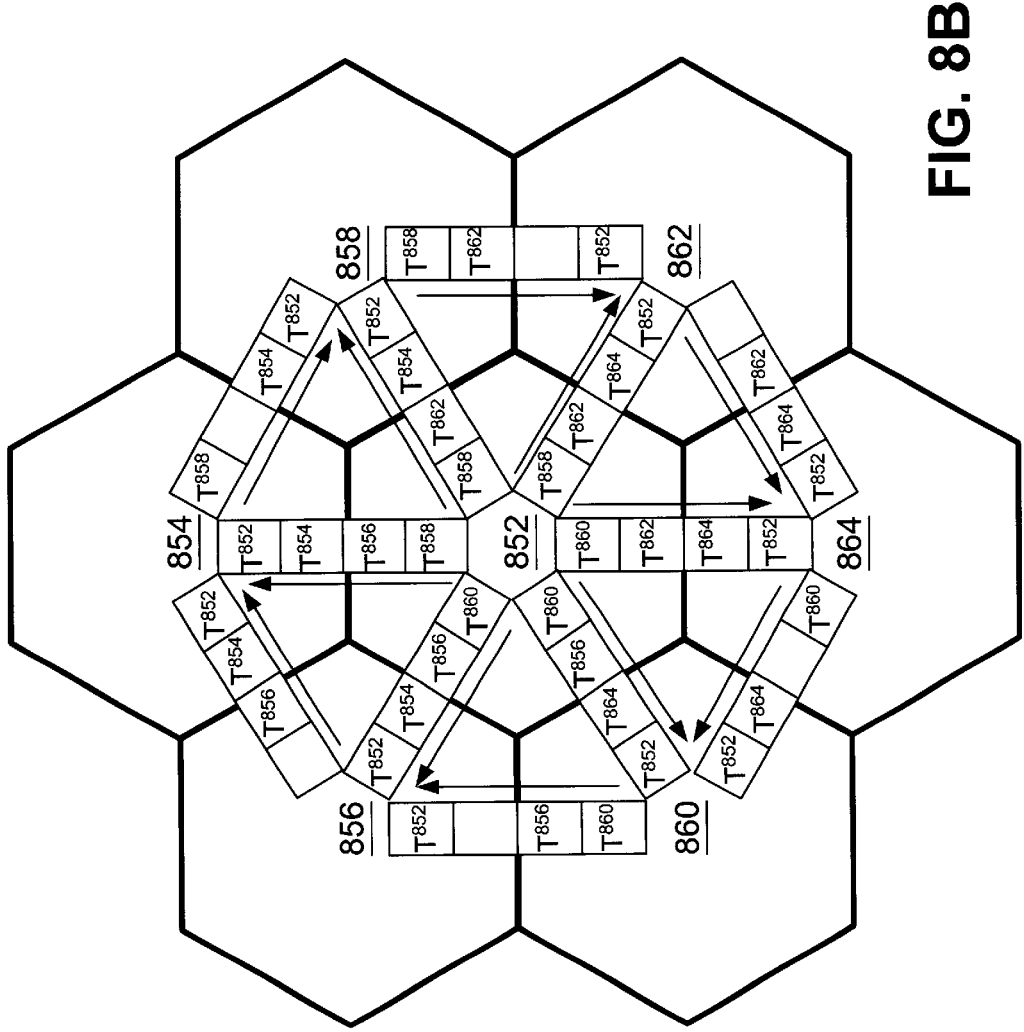
FIG. 8B is a diagram illustrating an arrangement of seven cells in a hexagonal pattern with which a second technique of interference avoidance of the present invention is employed.

FIG. 8B is a diagram illustrating an arrangement of seven cells in a hexagonal pattern with which interference avoidance of the present invention is employed. The six cells 854–864 surrounding the center cell 852 are considered "first-tier cells". The present invention can be applied to such an arrangement to reduce potential first tier inter-cell interference. Scheduling of transmission can be done for the seven cells using a four slot scheduling structure based on a known four-color theorem. Transmissions in the cells 852–864 are scheduled in time where $T^k$ indicates the transmission time for node number k, where k=854, 856, 858, 860, 862, 864. The arrow line in FIG. 8B indicates advancing time. In this way, no two adjacent cells would be transmitting at the same time in a manner that would significantly result in inter-cell interference. Scheduling using the four-color algorithm results in a significant improvement in cell-border C/I performance.

An additional aspect of the invention is the use of a "superframe" to facilitate overlaying non-real-time constraint packet service with real time service to achieve at least partial interference reduction. A "superframe" contains both types of information and is split into a number of time slots, some of which are dedicated to be used for real time services, others are dedicated to be used for non-real time services, such as packet data transmission.

For example, the length of the superframe can be 20 ms, which can be split into 16 1.25 ms slots. In the first eight of those slots, information (such as real-time information) could be transmitted continuously, as in the conventional system. The remaining eight slots could be transmitting data in accordance with the time division transmission of the described invention. That is, the second eight slots would be alternately transmitting such that adjacent beams/user-group areas would not be receiving data during the same time intervals. In this way, a hybrid structure is used to effect at least a partial reduction in interference.

As described herein, important features of the invention include: time division transmission among the adjacent beams to avoid inter-beam interference, time division transmission among the adjacent base stations to avoid inter-cell interference, synchronization and control of the transmission instant among the packets and base-stations for non-real-time constraint packets, applicability to synchronized forward/reverse link and/or synchronized base stations, and the ability for non-real-time constraint packets to be overlaid with the real time service to achieve partial interference reduction.

Figure 9:
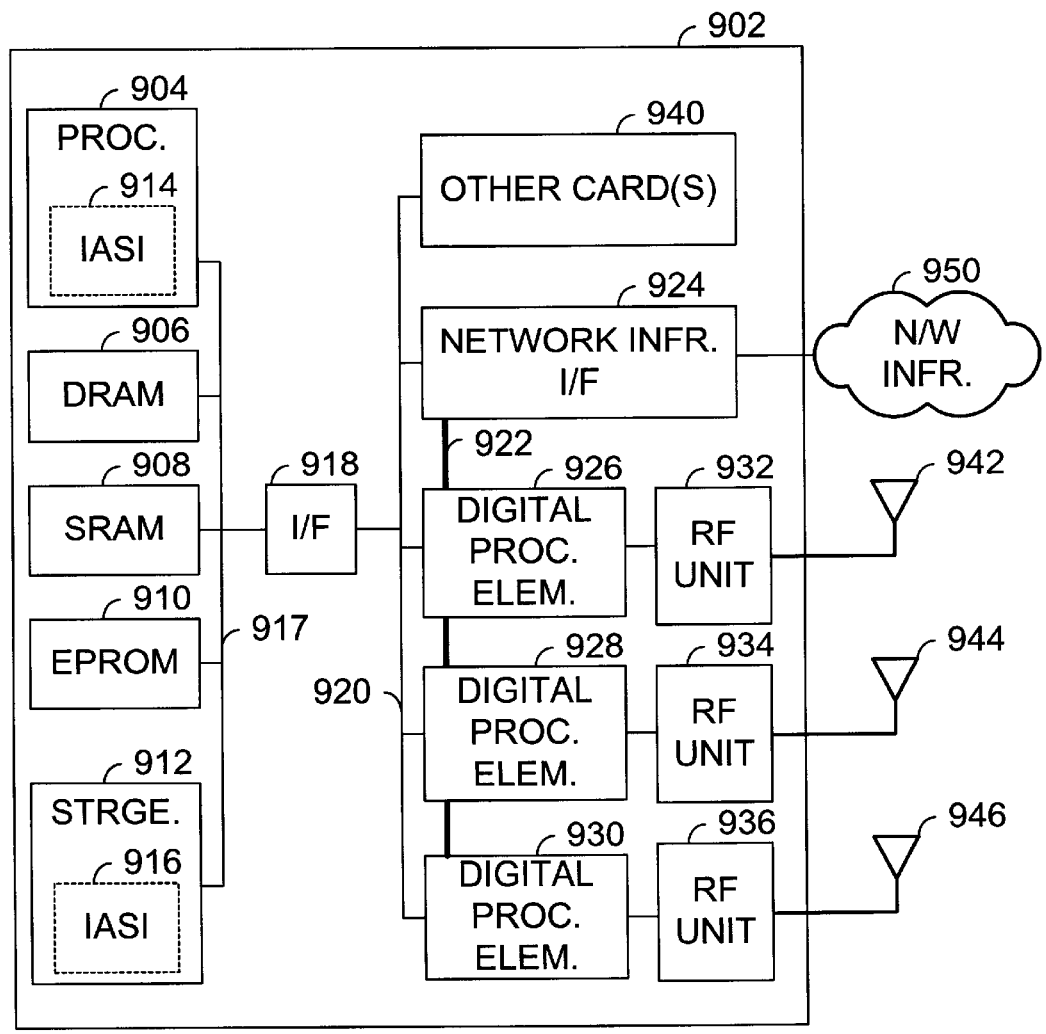
FIG. 9 is a block diagram illustrating a base station constructed according to the present invention that supports multi-beam sectors and interference avoidance.

FIG. 9 is a block diagram illustrating a base station 902 constructed according to the present invention that supports multi-beam sectors and interference avoidance. The base station 902 supports the CDMA operating protocol, e.g., IS-95A, IS-95B, IS-2000, and/or various 3G and 4G standards that have been modified according to the present invention. However, in other embodiments, the base station 902 supports other operating standards.

The base station 902 includes a processor 904, dynamic RAM 906, static RAM 908, Flash memory, EPROM 910 and at least one data storage device 912, such as a hard drive, optical drive, tape drive, etc. These components (which may be contained on a peripheral processing card or module) intercouple via a local bus 917 and couple to a peripheral bus 920 (which may be a back plane) via an interface 918. Various peripheral cards couple to the peripheral bus 920. These peripheral cards include a network infrastructure interface card 924, which couples the base station 902 to the wireless network infrastructure 950. Digital Processing Elements 926, 928, and 930 couple to RF units 932, 934, and 936, respectively. The RF units 932, 934, and 936 couple to beam forming antennas 942, 944, and 946, respectively, and support wireless communication between the base station 902 and user terminals (not shown). The base station 902 may include other cards 940 as well.

Interference Avoidance Software Instructions (IASI) 916 are stored in storage 912. The IASI 916 are downloaded to the processor 904 and/or the DRAM 906 as IASI 914 for execution by the processor 904. While the IASI 916 are shown to reside within storage contained in base station 902, the IASI may be loaded onto portable media such as magnetic media, optical media or electronic media. Further, the IASI may be electronically transmitted from one computer to another across a data communication path. These embodiments of the software instructions are all within the spirit and scope of the present invention. Upon execution of the IASI, the base station performs operations according to the present invention previously described herein with reference to the FIGS.

Figure 10:
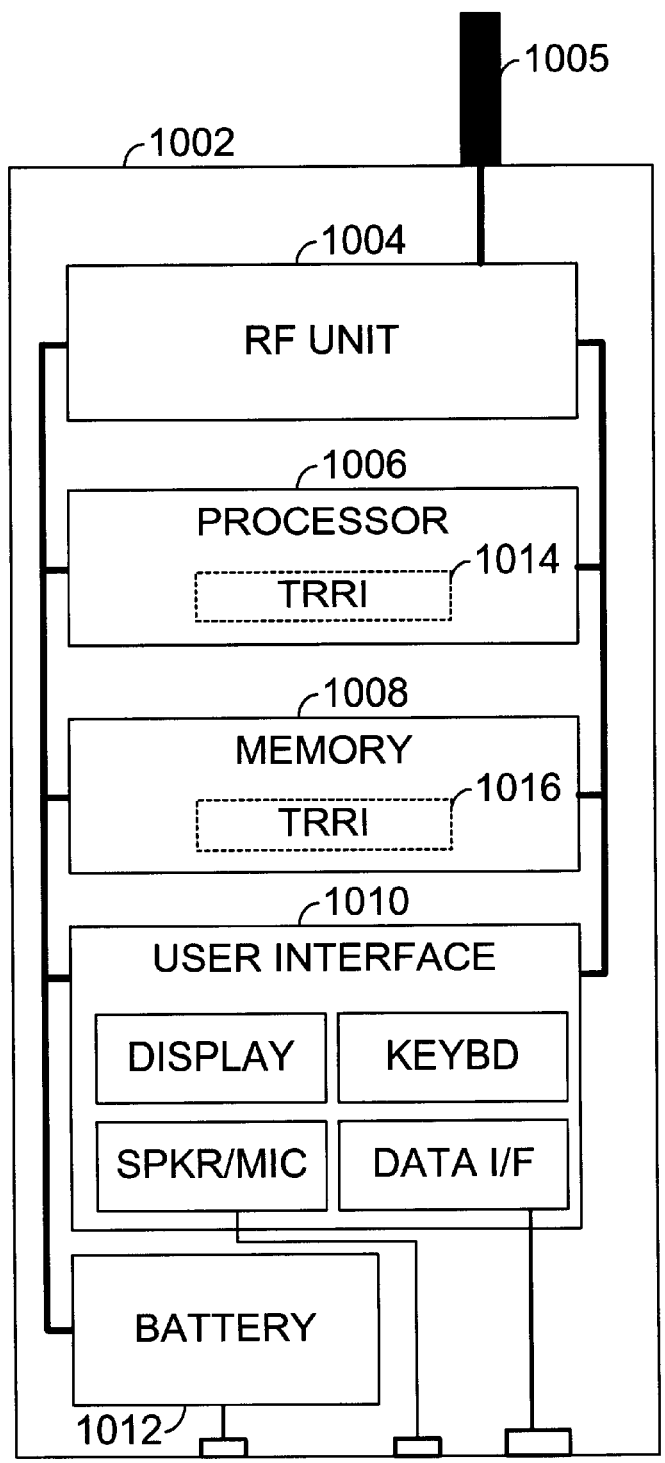
FIG. 10 is a block diagram illustrating a user terminal constructed according to the present invention that performs the operations previously described herein.

FIG. 10 is a block diagram illustrating a user terminal 1002 constructed according to the present invention that performs the operations previously described herein. The user terminal 1002 supports a CDMA operating protocol, e.g., IS-95A, IS-95B, IS-2000, and/or various 3G and 4G standards that is, or has been modified to be compatible with the teachings of the present invention. However, in other embodiments, the user terminal 1002 supports other operating standards.

The user terminal 1002 includes an RF unit 1004, a processor 1006, and a memory 1008. The RF unit 1004 couples to an antenna 1005 that may be located internal or external to the case of the user terminal 1002. The processor 1006 may be an Application Specific Integrated Circuit (ASIC) or another type of processor that is capable of operating the user terminal 1002 according to the present invention. The memory 1008 includes both static and dynamic components, e.g., DRAM, SRAM, ROM, EEPROM, etc. In some embodiments, the memory 1008 may be partially or fully contained upon an ASIC that also includes the processor 1006. A user interface 1010 includes a display, a keyboard, a speaker, a microphone, and a data interface, and may include other user interface components. The RF unit 1004, the processor 1006, the memory 1008, and the user interface 1010 couple via one or more communication buses/links. A battery 1012 also couples to and powers the RF unit 1004, the processor 1006, the memory 1008, and the user interface 1010.

Transmission Receipt and Response operation Instructions (TRRI) 1016 are stored in memory 1008. The TRRI 1016 are downloaded to the processor 1006 as TRRI 1014 for execution by the processor 1006. The TRRI 1016 may also be partially executed by the RF unit 1004 in some embodiments. The TRRI 1016 may be programmed into the user terminal 1002 at the time of manufacture, during a service provisioning operation, such as an over-the-air service provisioning operation, or during a parameter updating operation. The structure of the user terminal 1002 illustrated is only an example of one user terminal structure. Many other varied user terminal structures could be operated according to the teachings of the present invention.

Upon execution of the TRRI 1014, the user terminal 1002 performs operations according to the present invention in receiving pilot signals and in determining the quality of corresponding forward link channels. In one operation according to the present invention, the pilot signals are included in each time slot of each user group. In this operation, the user terminal 1002 measures the strengths of all received pilot signals. Then, the user terminal 1002 determines the channel quality (C/I) of each of the measured pilot signals.

However, in determining the C/I for each particular pilot signal, the user terminal 1002 must not include pilot signals corresponding to user groups for which data is transmitted during different time intervals than the user group corresponding to the particular pilot signal under consideration. For example, referring to the structure of FIG. 8A, data is transmitted to user terminals in sectors designated $T_1$ during a first time interval and data is transmitted to user terminals in sectors designated $T_2$ during a second time interval. However, pilot signals may be transmitted in both sectors designated $T_1$ and in sectors designated $T_2$ during both time intervals, e.g., see FIGS. 3, 6, or 7. When computing the channel quality for any sector designated $T_1$, the user terminal 1002 must not include the strength of pilot signals received from sectors designated $T_2$, and vice versa.

With the C/I calculations performed, the user terminal 1002 reports to its serving base station 902 a set of best pilot signals/channels and corresponding channel quality indications, i.e., C/I. In another operation, instead of reporting the C/I of the pilot signals/channels to its serving base station 902, the user terminal 1002 calculates a maximum data rate that may be supported on each channel of the set of best pilot signals/channels. The user terminal 1002 then reports a maximum data rate for each identified pilot signal/channel. The user terminal 1002 may report channel quality indications, i.e., C/I or data rate, to a servicing base station 902 via a reverse link control channel, a reverse link access channel, and/or a reverse link traffic channel.

When pilot signals are suppressed during time intervals in which no data is transmitted, e.g., see the operation of FIG. 4, the user terminal 1002 need not exclude the other pilot signals in the calculation of channel quality since they are not intended for it. In the example of FIG. 4, even when a pilot signal is suppressed for most intervals when no data is present, it must periodically be transmitted so that user terminals may determine the corresponding channel quality. Thus, the user terminal 1002 must monitor all pilot signals and determine corresponding channel quality indications at each time interval, even though some pilot signals may be suppressed during these time intervals, such as for user group 3 of FIG. 4.

Upon execution of the TRRI 1014, the user terminal 1002 also performs operations according to the present invention in determining in which user group(s) (and corresponding time interval(s)) transmissions are made by the base station 902 to the user terminal 1002 and in receiving the transmitted data. A first embodiment of these operations requires interaction with the base station 902 via forward link control channel/access channel. In the embodiment, the base station 902 indicates to the user terminal 1002 in which user group(s) it resides and at what data rate it will receive data. The base station 902 may also indicate to the user terminal 1002 within which frame(s) of one or more transmissions the user terminal 1002 will receive data. Based upon these instructions, the user terminal 1002 receives data within the particular user group(s) as indicated. In one modification to this operation, the base station 902 does not indicate at what data rate the data is transmitted but transmits the data at a maximum data rate that the user 1002 reports for the particular user group.

In another operation, the user terminal 1002 listens for transmissions within all user groups/channels corresponding to the channels for which it has reported a channel quality indication. Then, based upon indications contained in each transmission, the user terminal 1002 determines whether the transmission is for it intended. In a modification to this operation, the user terminal 1002 reports only one or two user groups within which it desires inclusion and listens only to these one or two user group transmissions. In still another modification to this operation, the base station 902 directs the user terminal 1002 to listen to, and receive transmissions in a subset of the reported user group channels and the user terminal listens only to the transmissions of these user groups.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. In a cellular wireless communication system, a method of transmitting data from a base station to a plurality of user terminals within a sector serviced by the base station, the method comprising:

dividing the sector geographically into a plurality of user-group areas, wherein each user-group area is serviced via a respective port of a beam forming antenna of the base station;

for each user-group area, transmitting a uniquely identifiable pilot signal via a respective port of the beam forming antenna of the base station;

receiving indications of received pilot signal strengths from at least some of the plurality of user terminals;

based noon the received indications of received pilot signal strengths from the plurality of user terminals assigning each reporting user terminal to a respective user-group area; and temporally synchronizing transmissions of darn from to base station to the plurality of user-group areas such that the base station does not transmit data at the same time to two geographically adjacent user-group areas.

2. The method of claim 1, wherein each pilot signal is uniquely identifiable based upon a respective code.

3. The method of claim 1, wherein receiving indications of received pilot signal strengths from at least some of the plurality of user terminals comprises receiving a plurality of received pilot signal strengths from a user terminal, each received pilot signal strength corresponding to an identified pilot signal.

4. The method of claim 1, further comprising suppressing the transmission of a pilot signal to a user-group area for a time period when data is not transmitted within the user-group area.

5. The method of claim 1, further comprising suppressing transmission of the pilot signal in a user-group area when data is not transmitted within the user-group area.

6. The method of claim 1, wherein a first user-group area served by the base station is geographically adjacent to a second user-group area served by a second base station.

7. The method of claim 6, further comprising temporally synchronizing transmissions of data from the base station to the first user-group area with transmissions of data from the second base station to the second user-group such that the transmissions to the first user-group and the transmissions to the second user-group do not temporally overlap.

8. The method of claim 1, wherein adjacent user-group areas served by the base station overlap.

9. The method of claim 8, further comprising for a user terminal residing within overlapping user-group areas, transmitting data to the user terminal within a user-group area of the overlapping user-group areas that has a better respective reported channel quality indication.

10. The method of claim 8, further comprising, for a user terminal residing within overlapping user-group areas, transmitting data to the user terminal within a user-group area of the overlapping user-group areas to equalize load within the overlapping user-group areas.

11. The method of claim 1, further comprising temporally coordinating transmissions of data from the base station in adjacent sectors.

12. A method of reducing cross-beam interference in a multi-beam antenna system wherein a base station transmits data to a plurality of user terminals within a sector, the method comprising:

dividing the sector geographically into two geographically adjacent user-group areas, wherein each user group area is serviced via a respective port of a beam forming antenna of the base station;

for each user-group area, transmitting a uniquely identifiable pilot signal via a respective port of the beam forming antenna of the base station;

receiving indications of received pilot signal strengths from at least some of the plurality of user terminals;

based upon the received indications of received pilot signal strengths from the plurality of user terminals assigning each reporting user terminal to a respective user-group area;

wherein data is transmitted from the base station to the two geographically adjacent user-group areas by transmitting data in two alternating sets of time slots, a first time slot of the two alternating sets of time slots being used by the base station to transmit data to a first user-group area of the two geographically adjacent user-group areas and a second time slot of the two alternating sets of time slots being used to transmit data to a second user-group area of the two geographically adjacent user-group areas, and wherein the two alternating sets of time slots do not overlap temporally.

13. A The method of claim 12, wherein each pilot signal is uniquely identifiable based upon a respective code.

14. The method of claim 12, wherein receiving indications of received pilot signal strengths from at least some of the plurality of user terminal comprises receiving a plurality of received pilot signal strengths from a user terminal, each received pilot signal strength corresponding to an identified pilot signal.

15. The method of claim 12, further comprising suppressing the transmission of a pilot signal to the first user-group area for a time period when data is not transmitted within the first user-group area.

16. The method of claim 15, further comprising suppressing transmission of the pilot signal in a user-group area when data is not transmitted within the user-group area.

17. The method of claim 12, wherein the first user-group area served by the base station is geographically adjacent to a third user-group area served by a second base station.

18. The method of claim 17, further comprising temporally synchronizing transmissions of data from the base station to the first user-group area with transmissions of data from the second base station to the third user-group such that the transmissions to the first user-group and the transmissions to the third-user group do not temporally overlap.

19. The method of claim 18, wherein the transmissions of data from the second base station to the third user-group further do not temporally overlap with the transmissions from the base station to the second user-group.

20. The method of claim 12, wherein the first user-group area geographically overlaps with the second user-group area.

21. The method of claim 20, further comprising, for a user terminal residing within the overlapping first and second user-group areas, transmitting data to the user terminal within a user-group area of the overlapping first and second user-group areas that has a better respective reported channel quality indication.

22. The method of claim 20, further comprising, for a user terminal residing within the overlapping first and second user-group areas, transmitting data to the user terminal within a user-group area of the overlapping first and second user-group areas to equalize load within the overlapping first and second user-group areas.

23. A method of operating a user terminal within a cellular wireless communication system to receive transmissions of data, the method comprising:
    receiving a plurality of pilot signals from a base station, wherein each pilot signal corresponds to a geographically distinct user-group area, wherein each geographically distinct user-group area is serviced via a respective port of a beam forming antenna of the base station, and wherein a plurality of geographically distinct user-group areas makes up a sector serviced by the base station;
    determining a plurality of channel quality indications, wherein each channel quality indication corresponds to a pilot signal;
    reporting at least one channel quality indication to the base station; and
    receiving one of a plurality of temporally synchronized transmissions of data from the base station, wherein the plurality of temporally synchronized transmissions of data correspond to a respective plurality of geographically distinct user-group areas, wherein the base station does not transmit data at the same time to two geographically adjacent user-group areas.

24. The method of claim 23, wherein the channel quality indication comprises a carrier to interference ratio.

25. The method of claim 23, wherein the channel quality indication comprises a maximum data rate supportable on a corresponding forward link channel.

26. The method of claim 23, wherein determining a plurality of channel quality indications comprises:
    measuring the strength of each received pilot signal; and
    determining a channel quality indication for a first pilot signal corresponding to a flint user-group area without considering a pilot signal corresponding to a geographically adjacent second user-group area.

27. The method of claim 23, wherein:
    the geographically adjacent user-group areas served by the base station overlap; and
    the user terminal is serviced via a user-group area of the adjacent user-group areas that has a relatively better channel quality.

28. The method of claim 23, wherein:
    the geographically adjacent user-group areas served by the base station overlap; and
    the user terminal is serviced by a user-group area of the adjacent user-group areas based upon user-group area load.

29. The method of claim 23, further comprising interacting with the base station to receive an indication that indicates in which user-group area the user terminal is to receive transmissions of data.

30. The method of claim 29, wherein the indication is received on a control channel.

31. The method of claim 23, further comprising:
    receiving transmissions from both of the geographically adjacent user-group areas;
    from the contents of each of the transmissions, determining that one of the transmissions includes a transmission of data for the user terminal; and
    receiving the transmission of data in the one of the transmissions.

32. A base station that transmits data to a plurality of user terminals within a sector of a corresponding cellular wireless communication system, the base station comprising
    an antenna;
    a Radio Frequency unit coupled to the antenna; and
    at least one digital processor coupled to the Radio Frequency unit that executes software instructions causing the base station to:
        divide the sector geographically into a plurality of user-group areas, wherein each user-group area is serviced via a respective port of a beam forming antenna of the base station;
        for each user-group area, transmit a uniquely identifiable pilot signal via a respective port of the beam forming antenna of the base station;
        receive indications of received pilot signal strengths from at least some of the plurality of user terminals;
        based upon the received indications of received pilot signal strengths from the plurality of user terminals assign each reporting user terminal to a respective user-group area; and
    temporally synchronize transmissions of data to the plurality of user-group areas such that the base station dues not transmit data at the same time to two geographically adjacent user-group areas.

33. A base station that transmits data to a plurality of user terminals within a sector, the base station comprising:
    an antenna;
    a Radio Frequency unit coupled to the antenna; and
    at least one digital processor coupled to the Radio Frequency unit that executes software instructions causing the base station to:
        divide the sector geographically into two geographically adjacent user-group areas, wherein each user group area is serviced via a respective port of a beam forming antenna of the base station;

for each user-group area, transmit a uniquely identifiable pilot signal via a respective port of the beam forming antenna of the base station;

receive indications of received pilot signal strengths from at least some of the plurality of user terminals;

based upon the received indications of received pilot signal strengths from the plurality in user terminals assign each reporting user terminal to a respective user-group area;

transmit data to the two geographically adjacent user-group areas by transmitting data in two alternating sets of time slots, a first time slot of the two alternating sets of time slots being used by the base station to transmit data to a first user-group area of the two geographically adjacent user-group areas and a second time slot of the two alternating sets of time slots being used to transmit data to a second user-group area of the two geographically adjacent user-group areas, and wherein the two alternating sets of time slots do not overlap temporally.

34. A plurality of software instructions stored on a media that, upon execution by a base station, cause the base station to transmit data to a plurality of user terminals within a sector, the plurality of software instructions comprising:

a set of instructions executed by the base station that cause the base station to divide the transmission area geographically into a plurality of user-group areas, wherein each user group area is serviced via a respective port of a beam forming antenna of the base station;

a set of instructions executed by the base station that cause the base station to, for each user-group area, transmit a uniquely identifiable pilot signal via a respective port of the beam forming antenna of the base station;

a set of instructions executed by the base station that cause the base station to receive indications of received pilot signal strengths from at least some of the plurality of user terminals;

a set of instructions executed by the base station that cause the base station to, based upon the received indications of received pilot signal strengths from the plurality of user terminals assigning each reporting user terminal to a respective user-group area; and a set of instructions executed by the base station that cause the base station to temporally synchronize transmissions of data to the plurality of user-group areas such that the base station does not transmit data at the same time to two geographically adjacent user-group areas.

35. A plurality of software instructions stored on a media that, upon execution by a base station, cause the base station to transmit data to a plurality of user terminals within a sector, the plurality of software instructions comprising:

a set of instructions executed by the base station that cause the base station to divide the sector geographically into two geographically adjacent user-group areas, wherein each user group area is serviced via a respective port of a beam forming antenna of the base station a set of instructions executed by the base station that cause the base station to receive user-group area, transmit a uniquely identifiable pilot signal via a respective port of the beam forming antenna of the base station;

a set of instructions executed by the base station that cause the base station to receive indications of received pilot signal strengths from at least some of the plurality of user terminals;

a set of instructions executed by the base station that cause the base station to, based upon the received indications of received pilot signal strengths from the plurality of user terminals assigning each reporting user terminal in a respective user-group area; and a set of instructions executed by the base station that cause the base station to transmit data to the two geographically adjacent user-group areas by transmitting data in two alternating sets of time slots, a first time slot of the two alternating sets of time slots being used by the base station to transmit data to a first user-group area of the two geographically adjacent user-group areas and a second time slot of the two alternating sets of time slots being used to transmit data to a second user-group area of the two geographically adjacent user-group areas, and wherein the two alternating sets of time slots do not overlap temporally.

36. A user terminal that acts as a wireless receiver to wirelessly receive a data packet from a base station acting as a transmitter, the user terminal comprising:

an antenna;

a Radio Frequency unit coupled to the antenna; and a digital processor coupled to the Radio Frequency unit that executes software instructions cawing the user terminal to:

receive a plurality of pilot signals from a base station, wherein each pilot signal corresponds to a geographically distinct user-group area, wherein each geographically distinct user-group area is serviced via a respective port of a beam forming antenna of the base station, and wherein a plurality of geographically distinct user-group areas makes up a sector;

determine a plurality of channel quality indications, wherein each channel quality indication corresponds to a pilot signal;

report at best one channel quality indication to the base station; and receive one of a plurality of temporally synchronized transmissions of data from the base station, wherein the plurality of temporally synchronized transmissions of data correspond to a respective plurality of geographically distinct user-group areas, wherein the base station does not transmit data at the same time to two geographically adjacent user-group areas.

37. A plurality of software instructions stored on a media that, upon execution by a user terminal, causes the user terminal to receive transmissions of data, the plurality of software instructions comprising:

a set of instructions executed by the user terminal that cause the user terminal to receive a plurality of pilot signals from a base station, wherein each pilot signal corresponds to a geographically distinct user-group area, wherein each geographically distinct user-group area is serviced via a respective port of a beam forming antenna of the base station, and wherein a plurality of geographically distinct user-group areas makes up a sector currently servicing the user terminal;

a set of instructions executed by the user terminal that cause the user terminal to determine a plurality of channel quality indications, wherein each channel quality indication corresponds to a pilot signal;

a set of instructions executed by the user terminal that cause the user terminal to report at least one channel quality indication to the base station; and a set of instructions executed by the user terminal that cause the user terminal to receive one of a plurality of temporally synchronized transmissions of data from the base station, wherein the plurality of temporally synchronized transmissions of data correspond to a respective plurality of geographically distinct user-group areas, wherein the base station does not transmit data at the seine time to two geographically adjacent user-group areas.

38. A method of operating a user terminal within a cellular wireless communication system to calculate forward link channel qualifies, the method comprising:

receiving a plurality of pilot signals, wherein each pilot corresponds to a geographically distinct user-group area that is serviced via a respective port of a beam forming antenna of a servicing base station, and wherein a plurality of geographically distinct user-group areas makes up a sector serviced by a base station;

measuring the strength of each of the plurality of pilot signals;

segregating the plurality of pilot signals into a first plurality of pilot signals corresponding to forward traffic channels that transmit during first time intervals and a second plurality of pilot signals corresponding to forward traffic channels that transmit during second time intervals, wherein the first time intervals do not overlap with the second time intervals;

for each pilot signal of the first plurality of pilot signals determining a corresponding forward link channel quality based only upon measured strengths of the first plurality of pilot signals; and for each pilot signal of the second plurality of pilot signals, determining a corresponding forward link channel quality based only upon measured strengths of the second plurality of pilot signals.

* * * * *